US011150078B1

(12) United States Patent
Zhao et al.

(10) Patent No.: US 11,150,078 B1
(45) Date of Patent: Oct. 19, 2021

(54) HIGH SENSITIVITY IMAGE-BASED REFLECTOMETRY

(71) Applicant: Applied Materials, Inc., Santa Clara, CA (US)

(72) Inventors: Guoheng Zhao, Palo Alto, CA (US); Mehdi Vaez-Iravani, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/831,643

(22) Filed: Mar. 26, 2020

(51) Int. Cl.
*G01B 11/02* (2006.01)
*G01B 9/02* (2006.01)
*G01B 11/06* (2006.01)

(52) U.S. Cl.
CPC ............ *G01B 11/02* (2013.01); *G01B 9/0203* (2013.01); *G01B 9/0209* (2013.01); *G01B 11/06* (2013.01); *G01B 11/0625* (2013.01)

(58) Field of Classification Search
CPC .......................... G01B 11/06; G01B 11/0625
See application file for complete search history.

(56) References Cited

U.S. PATENT DOCUMENTS

| | | |
|---|---|---|
| 5,166,755 A | 11/1992 | Gat |
| 6,437,862 B1 * | 8/2002 | Miyazaki ............ G01N 21/9501 250/205 |
| 2004/0169861 A1 | 9/2004 | Mieher et al. |
| 2004/0227948 A1 | 11/2004 | Debevec et al. |
| 2004/0246493 A1 * | 12/2004 | Kim .................... G01B 11/0625 356/504 |
| 2006/0063262 A1 | 3/2006 | Sopori |
| 2006/0109475 A1 * | 5/2006 | Misener ............ G01N 21/8483 356/446 |
| 2006/0289789 A1 | 12/2006 | Raymond et al. |
| 2009/0213328 A1 | 8/2009 | Isobe et al. |
| 2009/0219518 A1 | 9/2009 | Baldwin et al. |
| 2013/0063719 A1 * | 3/2013 | Morris .................. G01J 1/4257 356/121 |
| 2015/0043006 A1 | 2/2015 | de Groot |
| 2015/0300809 A1 | 10/2015 | Kononchuk et al. |
| 2018/0252514 A1 | 9/2018 | Pandev et al. |

(Continued)

FOREIGN PATENT DOCUMENTS

| | | |
|---|---|---|
| EP | 3 428 572 A1 | 1/2019 |
| JP | 2019-158351 A | 9/2019 |

(Continued)

OTHER PUBLICATIONS

International Search Report and Written Opinion for Application No. PCT/US2020/013185, dated May 8, 2020, 12 pages.

(Continued)

*Primary Examiner* — Michael A Lyons
(74) *Attorney, Agent, or Firm* — Kilpatrick Townsend & Stockton

(57) ABSTRACT

Methods for performing imaging reflectometry measurements include determining a representative reflectance intensity value using multiple images of a measurement area that includes a particular structure and/or using a plurality of pixels each associated with the particular structure within the measurement area. A parameter associated with the particular structure is determined using the representative reflectance intensity value.

17 Claims, 9 Drawing Sheets

(56) References Cited

U.S. PATENT DOCUMENTS

2019/0302010 A1  10/2019  Porter et al.
2019/0391088 A1  12/2019  Lynch
2020/0232916 A1   7/2020  Zhao et al.

FOREIGN PATENT DOCUMENTS

KR   10-2011-0089486 A    8/2011
KR       10-1537854 B1    7/2015
WO       2013/181156 A1  12/2013
WO       2016/020925 A1   2/2016
WO       2016/070155 A1   5/2016

OTHER PUBLICATIONS

U.S. Appl. No. 16/295,173 Notice of Allowance dated Jul. 16, 2020, 9 pages.
U.S. Appl. No. 16/831,575 Non-Final Office Action dated Mar. 2, 2021, 13 pages.
International Search Report and Written Opinion for Application No. PCT/US2021/022169, dated Jun. 28, 2021, 9 pages.
International Search Report and Written Opinion for Application No. PCT/US2021/022174, dated Jul. 1, 2021, 11 pages.
U.S. Appl. No. 16/831,575 Notice of Allowance dated Jul. 15, 2021, 8 pages.

\* cited by examiner

HIGH SENSITIVITY IMAGE-BASED REFLECTOMETRY

FIELD

Embodiments described herein relate generally to imaging reflectometers, and more particularly, to methods for improving sensitivity of image-based reflectometry measurements.

BACKGROUND

Imaging reflectometry can be used to measure critical dimensions (CDs) of small features and thicknesses of films. Systems that perform these measurements typically utilize either a spot scanning mechanism or a line scanning mechanism. For a spot scanning mechanism, a spectrum of each spot is recorded by a spectrometer that generally includes a grating or prism to distribute the spectrum onto a line sensor. For a line scanning mechanism, each row of an area sensor records an image of a scanning line and each column records a spectrum. These mechanisms provide flexibility for handling large samples or samples with large measurement fields.

Imaging reflectometry systems and methods that provide improved measurement sensitivity are desired.

SUMMARY

Embodiments described herein provide improved sensitivity of image-based reflectometry measurements. Image-based reflectometry measurements can be used to identify different characteristics or features of a sample depending on the contrast generated. The ability of image-based reflectometry measurements to distinguish between similar characteristics or features depends on a signal to noise ratio. Increasing the number of electrons in each pixel of an image sensor can increase the signal, but each pixel has a full well capacity that limits the amount of charge a pixel can hold before reaching saturation. To overcome this limitation, some embodiments described herein increase a reflectivity signal by combining measurements from pixels associated with a particular structure on a sample and/or by combining reflectometry measurements from pixels associated with a particular structure in multiple images. This effectively increases a number of electrons without exceeding full well capacity.

In accordance with a particular embodiment, for example, a method for performing imaging reflectometry measurements includes illuminating a measurement area on a sample using an input beam; receiving portions of the input beam reflected from the sample at an imaging sensor; obtaining multiple images of the measurement area using the portions of the input beam reflected from the sample and received at the imaging sensor, each of the multiple images comprising a plurality of pixels, wherein corresponding pixels include a single pixel from each of the multiple images that is associated with approximately a same part of the measurement area in each of the multiple images; determining a reflectance intensity value for each of the plurality of pixels in each of the multiple images; determining a representative reflectance intensity value for each of the corresponding pixels based on the reflectance intensity value of each pixel of the corresponding pixels; and determining a parameter associated with a structure on a surface of the sample within the measurement area based at least in part on the representative reflectance intensity value of each of the corresponding pixels that are associated with the structure in the multiple images.

In an embodiment, the representative reflectance intensity value for each of the corresponding pixels is an average based on the reflectance intensity value of each pixel of the corresponding pixels.

In another embodiment, the method also includes determining a composite image of the measurement area, wherein each pixel of the composite image is determined based on the representative reflectance intensity value for each of the corresponding pixels.

In another embodiment, the parameter associated with the structure is film thickness or critical dimension.

In some embodiments, each of the multiple images are obtained using approximately a same integration length of time, or each of the multiple images are obtained using a different integration length of time.

In another embodiment, the portions of the input beam are reflected from the surface of the sample.

In yet another embodiment, the structure comprises a plurality of structures.

In accordance with another embodiment, a method for performing imaging reflectometry measurements includes illuminating a measurement area on a sample using an input beam, the measurement area including first sub-areas that each include similar structures on a surface of the sample, and second sub-areas that each include similar structures on a surface of the sample that are different than the similar structures in the first sub-areas; receiving portions of the input beam reflected from the sample at an imaging sensor; obtaining an image of the measurement area using the imaging sensor, the image comprising a plurality of pixels; identifying a first portion of the plurality of pixels that are associated with the first sub-areas and a second portion of the plurality of pixels that are associated with the second sub-areas; determining a first reflectance intensity value for each pixel of the first portion of the plurality of pixels that are associated with the first sub-areas; determining a first representative reflectance intensity value based on the first reflectance intensity value of each pixel in the first portion of the plurality of pixels that are associated with the first sub-areas; and determining a parameter associated with the similar structures in the first sub-areas based at least in part on the first representative reflectance intensity value.

In an embodiment, at least some of the first sub-areas are not immediately adjacent to others of the first sub-areas within the measurement area.

In another embodiment, the similar structures in the first sub-areas have a similar surface pattern, and the similar structures in the second sub-areas have a different surface pattern.

In another embodiment, the method also includes determining a second reflectance intensity value for each pixel of the second portion of the plurality of pixels that are associated with the second sub-areas; determining a second representative reflectance intensity value based on the second reflectance intensity value of each pixel in the second portion of the plurality of pixels that are associated with the second sub-areas; and determining a parameter associated with the similar structures in the second sub-areas based on the second representative reflectance intensity value.

In yet another embodiment, the similar structures in the first sub-areas each comprise a plurality of structures.

Further aspects, advantages, and features are apparent from the claims, description, and accompanying drawings.

BRIEF DESCRIPTION OF THE DRAWINGS

The various embodiments described herein, both as to organization and method of operation, together with features and advantages thereof, can best be understood by reference to the following detailed description and accompanying drawings, in which.

Figure 1:
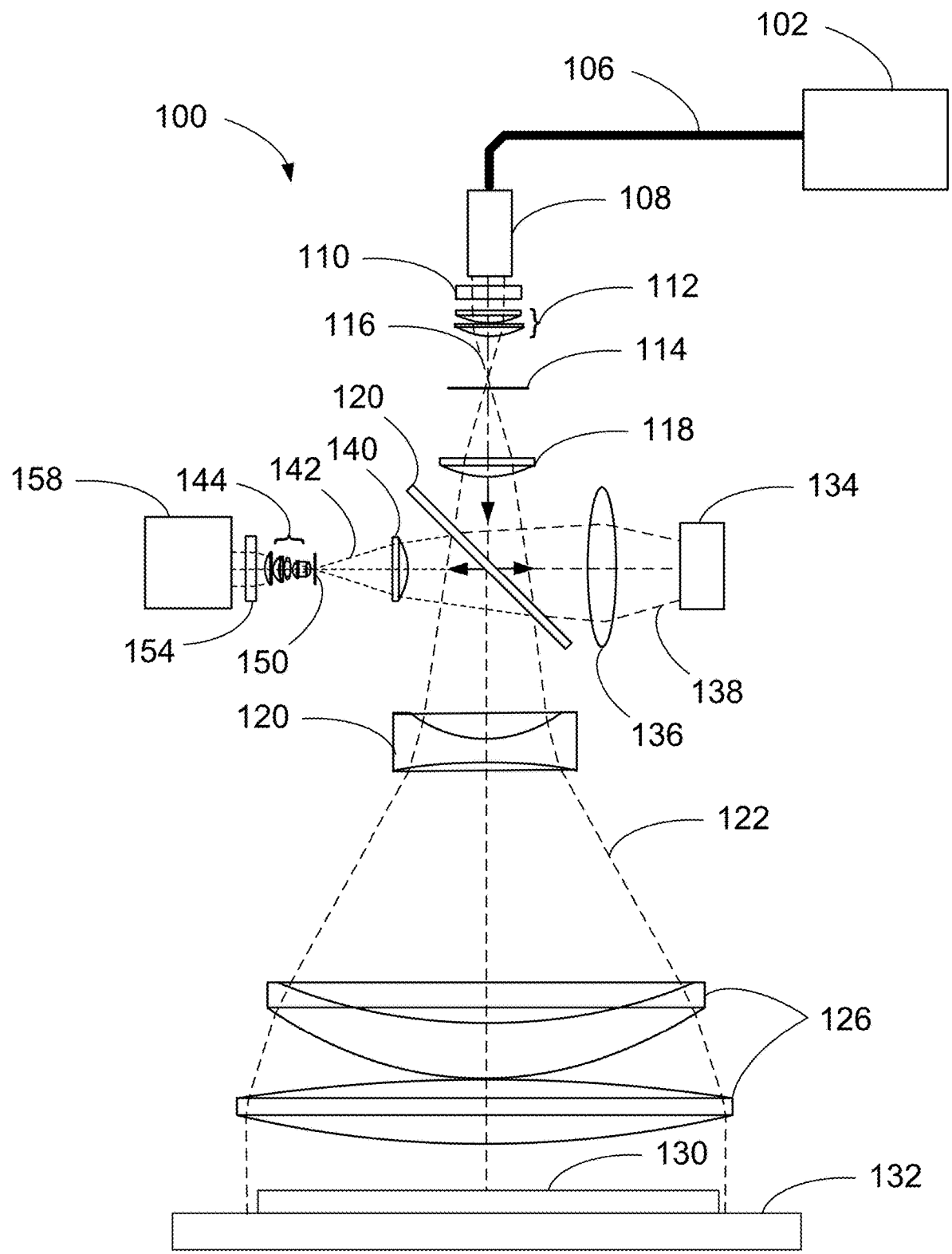
FIG. 1 is a simplified cross-sectional view of an imaging reflectometer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the embodiments described herein. However, it should be understood that the various embodiments can be practiced without these specific details. In other instances, well-known methods, procedures, and components have not been described in detail so as not to obscure the described features.

Reference will be made in detail to the various embodiments, one or more examples of which are illustrated in the figures. Each example is provided by way of explanation and is not meant as a limitation. Further, features illustrated or described as part of one embodiment can be used on or in conjunction with other embodiments to yield yet further embodiments. The description is intended to include these modifications and variations.

A "specimen" or "sample" as referred to herein, includes, but is not limited to, a semiconductor wafer, a semiconductor work piece, a photolithography mask, and other work pieces such as a memory disk and the like. According to some embodiments, which can be combined with other embodiments described herein, the systems and methods are configured for or are applied to reflectometry applications.

Embodiments described herein relate generally to improving sensitivity of imaging reflectometry measurements. In some embodiments, a reflectivity signal is increased by combining measurements from pixels associated with a particular structure on a sample. The particular structure may include multiple structures on the sample that may or may not be adjacent to one another. In other embodiments, the reflectivity signal is increased by combining reflectometry measurements from pixels associated with a particular structure in multiple images.

FIG. 1 is a simplified cross-sectional view of an imaging reflectometer 100 in accordance with an embodiment. The imaging reflectometer 100 shown in this example can be used to implement the methods described herein. However, the imaging reflectometer 100 is shown merely as an example and other imaging reflectometers can perform the described methods. Merely by way of example, imaging reflectometers configured to obtain images of a part of a sample, rather than an entire sample, and/or imaging reflectometers using single or multi-wavelength light sources, may be used to perform the methods.

In the example of FIG. 1, light from a source module 102 is relayed through a light guide 106 to a homogenizer 108. Light 116 from the homogenizer 108 passes through illumination pupil 114 and is directed toward beam splitter 120. A portion 138 of the light 116 is reflected by the beam splitter 120 toward a reference sensor 134, and a portion 122 of the light passes through the beam splitter 120 and continues along an optical path toward a sample 130.

The portion 122 of the light 116 that passes through the beam splitter 120 is imaged by a large field lens 126 onto the sample 130. Light reflected from the sample 130 is directed through at least a portion of the lens 126 and reflected by the beam splitter 120 toward an imaging sensor 158.

The imaging reflectometer 100 may include a number of other lenses (e.g., 110, 112, 118, 136) that shape and/or direct the light along the optical paths to illuminate the sample 130, illuminate the reference sensor 134, direct the light to other lenses (e.g., 120, 140, 144), and direct the light reflected from the sample to the imaging sensor 158. In some embodiments, for example, the light may pass through one or more polarizers (e.g., polarizers 110, 154). The one or more polarizers can be inserted in an illumination and/or an imaging path to provide enhanced sensitivity for the dimension change of pattern structures and/or film thickness on the sample 130 when patterns are not circularly symmetric. Wave plates can also be inserted to alter the phase of the polarized light. The wave plates and/or polarizers can be at fixed angles to provide polarized reflectometry measurements or can be rotating to provide ellipsometry measurements. It should be appreciated that imaging reflectometers in accordance with the embodiments described herein may not include all the optical elements shown in the example of FIG. 1 and/or may include other optical elements that are not included in this example.

The source module 102 in this example provides a multi-wavelength light source that may sequentially generate different light beams each having a narrow wavelength range. In some embodiments, the multi-wavelength light source is provided by a plurality of light sources that can be activated individually. Each of the light sources generates a light beam, and at least some of the light beams have different nominal wavelengths.

In other embodiments, the multi-wavelength light source is provided by adjusting the source power to the source module 102 to generate light beams having different nominal wavelengths. The power of each wavelength can be independently controlled to optimize the dynamic range of measured reflectance at each wavelength.

In yet other embodiments, the multi-wavelength light source is provided by a broadband light source and a set of band pass filters. The broadband light source may be used with the band pass filters to generate the light beams at selected nominal wavelengths.

In yet other embodiments, the source module 102 may include both a plurality of light sources, a broadband light source, and a set of band pass filters.

In an embodiment, the large field lens 126 has a measurement field size (or illumination area) that is slightly greater than a size of the sample 130 so that full-sample images can be acquired by the imaging sensor 158 without scanning the light or moving a stage 132. For example, the large field lens 126 may have a measurement field size of 300 mm or more for measuring a semiconductor wafer having a 300 mm diameter. The large field lens 126 may be a telecentric lens so that light rays traveling from the large field lens 126 to the sample 130 are approximately parallel to an optical axis that is substantially perpendicular to a surface of the sample 130. This provides substantially normal illumination over the entire sample 130 or across an entire measurement area. This can reduce measurement error since the illumination angles are approximately the same. Telecentric imaging allows the light reflected at substantially the same angle across the entire field to reach an imaging sensor. In an embodiment, for example, the light illuminating the sample 130 may have a telecentricity error of less than 0.3 degrees over a wavelength range of about 350 nm to about 1200 nm, and in some embodiments, a telecentricity error of less than 1% over a wavelength range of about 350 nm to about 1100 nm. As used herein, the telecentricity error is a measure of angular deviation of a light ray incident and reflected from the wafer surface from normal (or from the optical axis).

In some embodiments, the large field lens 126 has a field size that is smaller than a diameter of the sample 130. In this case, an area (or measurement area) is imaged and the optics and/or the stage 132 may be moved and/or the optical module may be scanned to image adjacent fields. Depending on the application, a measurement area may be approximately the same size as a die or stepper field. Adjacent images may be stitched using known techniques to provide multi-field or full-sample images.

The imaging sensor 158 may be an area imaging sensor that includes one or more digital cameras for capturing the light 142 that is reflected from the sample 130 and passes through imaging pupil 150. The imaging sensor 158 provides an image of the sample 130 based on the received light 142. The imaging sensor 158 may include a single camera in some embodiments that is configured to image the entire surface of the sample 130. The imaging sensor 158 may include multiple cameras in other embodiments that each image adjacent or slightly overlapping fields (or measurement areas) on the sample 130. Adjacent images may be stitched together using known techniques. Image resolution may be increased by using a higher resolution imaging sensor or using multiple imaging sensors that each image a smaller field.

The imaging reflectometer 100 includes an illumination path that provides light to the sample 130 and an imaging path that provides light to the imaging sensor 158. This allows independent control of an illumination numerical aperture (NA) and an imaging NA. Merely by way of example, if the imaging sensor 158 has an array size of 5120 pixels by 5120 pixels and the imaging NA is about 0.004, the pixel size on the sample 130 is about 60 μm for a 300 mm wafer, which has a Rayleigh resolution of about 55 μm at a wavelength of 365 nm and a Rayleigh resolution of about 153 μm at a wavelength of 1 μm. Generally, the illumination NA is greater than the imaging NA to correct residual chromatic telecentric errors and to provide tolerance to tilt and bow of the sample 130. In some embodiments, the illumination NA may range from about 0.005 to about 0.5, and the imaging NA may range from about 0.003 to about 0.2.

The reference sensor 134 may include one or more digital cameras for capturing the light 138 that is reflected from the beam splitter 120. The reference sensor 134 may have a lower resolution than the imaging sensor 158. The reference sensor 134 may be used to monitor uniformity and stability of the light 138 and to provide real time calibration of the reflectance measurements made by the imaging sensor 158. Measurements at the reference sensor 134 may be used to adjust characteristics of the light sources (e.g., output power) to provide spatial and temporal corrections.

Figure 2:
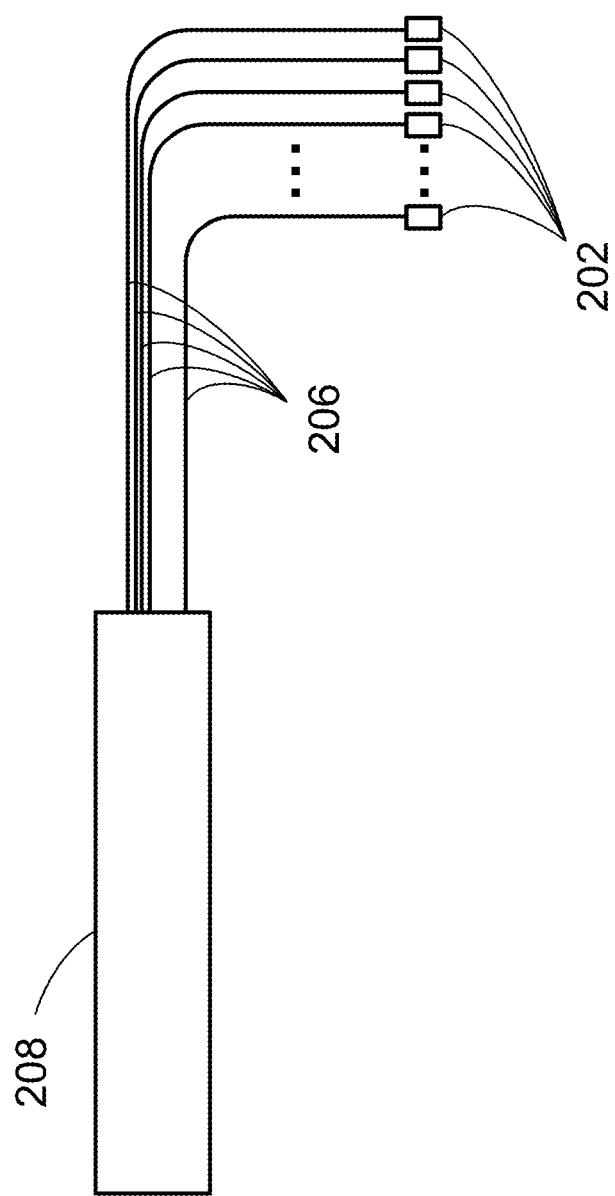
FIG. 2 is a simplified cross-sectional view of a multi-wavelength light source.

FIG. 2 is a simplified cross-sectional view of a multi-wavelength light source in accordance with an embodiment. The multi-wavelength light source may be used, for example, as part of the source module 102 in the imaging reflectometer 100 of FIG. 1. The multi-wavelength light source includes a plurality of light sources 202 and a plurality of optical fibers 206. The light sources 202 may each include one or more light emitting diodes (LEDs) and/or laser diodes (LDs). The light sources 202 are each optically coupled with a homogenizer 208 by one of the optical fibers 206. Each of the light sources 202 generates a beam, and at least some of the beams may have different nominal wavelengths. Light from the homogenizer 208 may be directed to a large field lens and used to image a sample as described with regard to FIG. 1.

In an embodiment, the multi-wavelength light source sequentially generates different ones of the input beams and/or sequentially generates combinations of multiple input beams. The beams may be sequentially generated at a switching rate that is generally the same as the frame rate of an imaging sensor (e.g., the imaging sensor 158 shown in FIG. 1) to achieve one image per wavelength of the same field on a sample. The frame rate of a sensor can be faster than the wavelength switching rate in some embodiments. A faster switching rate enables averaging of multiple images at each wavelength to achieve higher signal to noise ratio. Output power for each of the light sources 202 may be independently controlled and adjusted so that the sensor signal is close to saturation at each wavelength to maximize signal to noise ratio. Each of the light sources 202 may have sufficient output power to enable high speed measurements (or measurements at or near a readout speed of the imaging sensor).

In some embodiments, the optical throughput may be increased by inserting diffusers between the optical fibers 206 and the homogenizer 208. Multiple light sources 202 can be combined by other means such as dichroic beam splitters, and the light sources 202 can be coupled into the homogenizer 208 by other means such as free space optics relay.

In some embodiments, band pass filters can be inserted between each of the light sources 202 and their respective optical fiber 206 to narrow the bandwidth of each wavelength. Narrower bandwidths can provide better sensitivity for measurement of thick film stacks or dense patterns on a surface of the sample. Bandpass filters can define measurement wavelengths accurately by eliminating the wavelength drift of LEDs to improve measurement accuracy.

The imaging sensor (e.g., the imaging sensor 158 shown in FIG. 1) may have a high readout speed (e.g., 50 to 1000 frames per second (FPS) or more and up to 100 million pixels per frame or more). As an example, at a readout speed of 100 FPS, the imaging sensor may be capable of performing 6000 reflectivity measurements per minute. The measurements can be at the same or different wavelengths. Obtaining multiple measurements at the same wavelength can enhance signal to noise ratio and improve measurement sensitivity.

Figure 3:
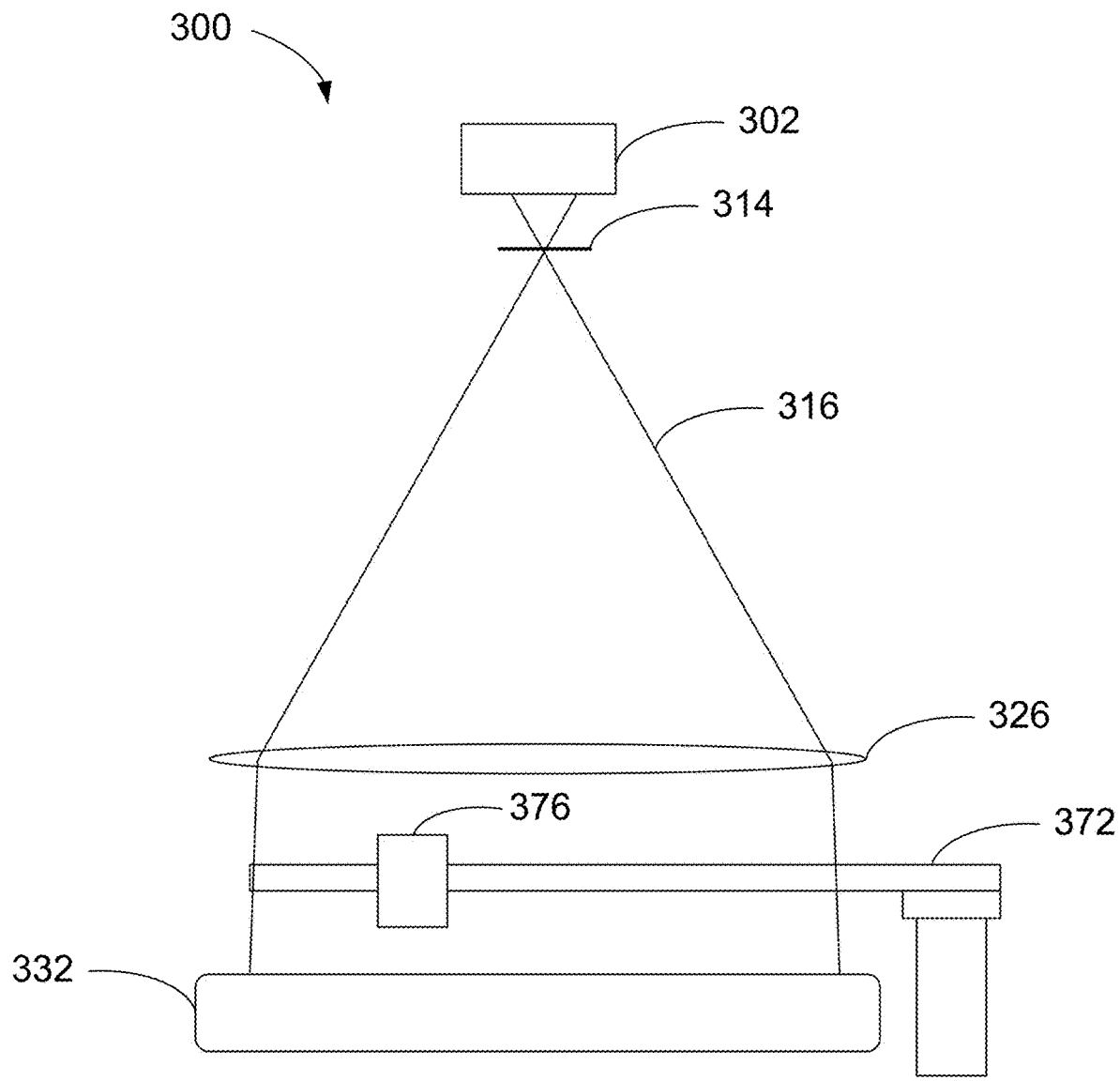
FIG. 3 is a simplified cross-sectional view of an imaging reflectometer system configured to provide area reflectometry measurements and spot reflectometry measurements.

FIG. 3 is a simplified cross-sectional view of an imaging reflectometer system 300 configured to provide area reflectometry measurements and spot reflectometry measurements in accordance with an embodiment. In this example, light from a source module 302 passes through an illumination pupil 314 and is directed toward a large field lens 326. The large field lens 326 may have a field size (or illumination area) that enables area reflectometry measurements without scanning the light or moving the stage 332. The large field lens 326 may be a telecentric lens so that light rays traveling from the large field lens 326 to a sample are substantially parallel to an optical axis and have a low telecentricity error similar to the imaging reflectometer of FIG. 1 described above.

In this example, the imaging reflectometer system 300 also includes a spot reflectometer 376. The spot reflectometer 376 may be a high sensitivity reflectometer that enables spot reflectometry measurements. The spot reflectometer 376 may be mounted on a robotic arm 372 that allows movement of the spot reflectometer 376 to any position over a sample for spot measurements and/or movement outside a field of view of the large field lens 326 during area measurements. The robotic arm may be, for example, an R-theta robotic arm. Alternatively, the stage 332 may be an x-y scanning stage that positions a sample under the large field lens 326 or the spot reflectometer 376.

In some embodiments, the large field lens 326 may be used to perform full-sample or large area image reflectometry measurements. Using the area measurements, a particular spot or spots on the sample may be identified for further measurements, and the spot reflectometer 376 may be used to perform spot reflectometry measurements at the particular spots. A wavelength range of the spot reflectometer 376 may be greater than a wavelength range of the large field lens 326.

FIG. 3 is a simplified cross-sectional view of the imaging reflectometer system 300, and many parts and components are not shown for simplicity. For example, this figure does not separately show a beam splitter, a reference sensor, an imaging sensor, an imaging pupil, and/or a number of other components. It should be appreciated that the imaging reflectometer system 300 may include these and other components such as those described with regard to FIG. 1 and/or other conventional reflectometer systems.

Figure 4:
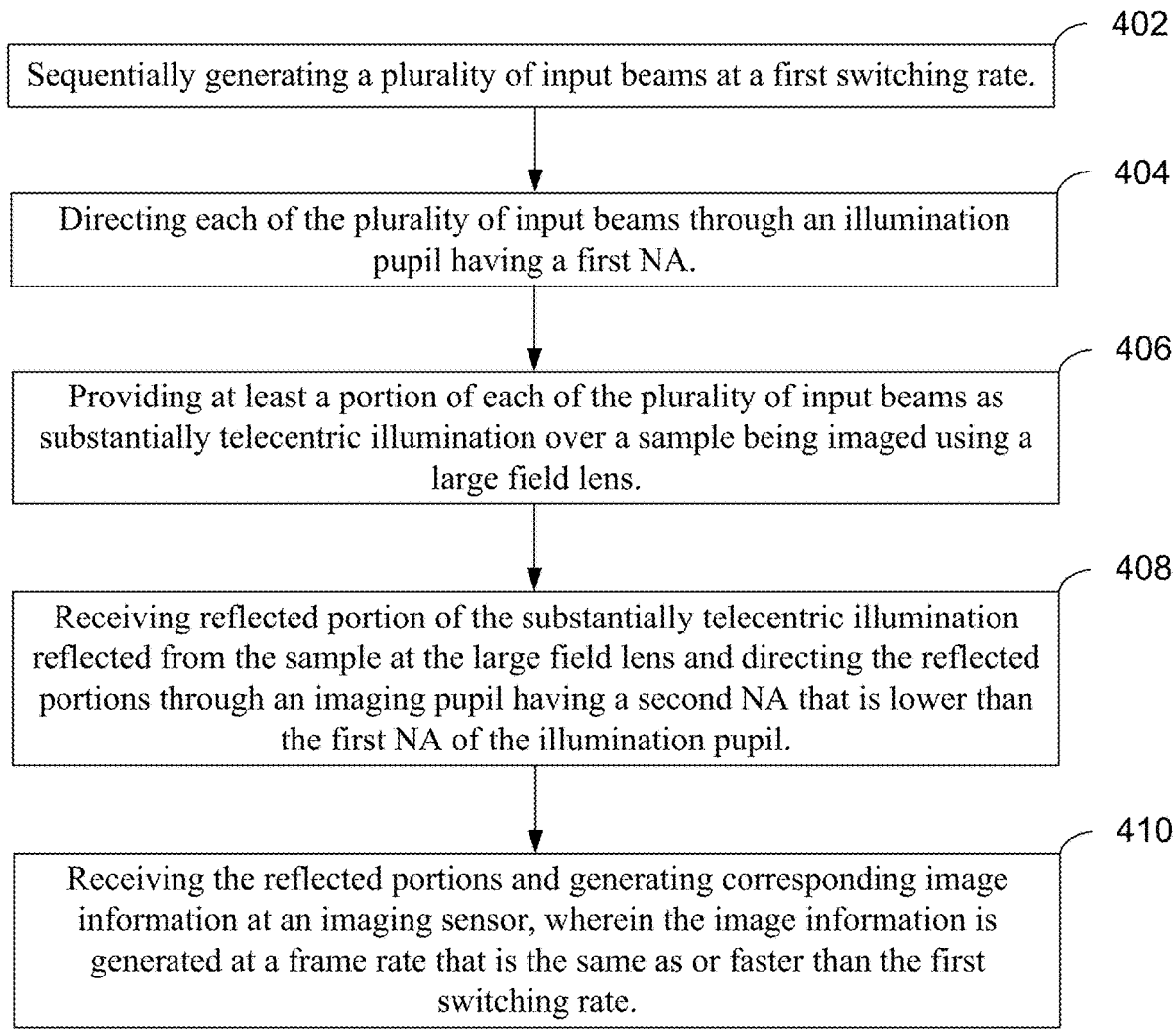
FIG. 4 is a flowchart outlining a method for measuring reflectivity of a sample.

FIG. 4 is a flowchart outlining a method for measuring reflectivity of a sample using an imaging reflectometer that includes a large field lens in accordance with an embodiment. The method includes sequentially generating a plurality of input beams at a first switching rate (402). In some embodiments, each of the plurality of input beams are generated by a different light source, and at least some of the plurality of input beams may have different nominal wavelengths than others of the plurality of input beams. In other embodiments, at least some of the plurality of input beams are generated by a broadband light source, and a wavelength of each of the plurality of input beams is defined using a set of band pass filters.

Each of the plurality of input beams is directed through an illumination pupil having a first NA (404). The illumination pupil may be arranged along a first optical path. In some embodiments, each of the plurality of input beams may be split, and a first portion of each of the plurality of input beams may be directed along a first optical path toward a reference sensor, and a second portion of each of the plurality of input beams may be allowed to continue along the first optical path.

At least a portion of each of the plurality of input beams is provided as substantially telecentric illumination over a sample being imaged using the large field lens (406). A portion of each of the plurality of input beams may also be provided to the reference sensor for monitoring uniformity and stability of the input beams. In some embodiments, a measurement field of the large field lens may larger than the sample being imaged to provide full-sample measurements.

Reflected portions of the substantially telecentric illumination reflected from the sample are received at the large field lens and directed through an imaging pupil having a second NA that is lower than the first NA of the illumination pupil (408). The reflected portions may be directed through the imaging pupil using a beam splitter.

The reflected portions are received and corresponding image information is generated at an imaging sensor module, wherein the image information is generated at a frame rate that is the same as or faster than the first switching rate (410). The image information may be calibrated or normalized based on information from the reference sensor.

In some embodiments, images obtained using embodiments described herein may be processed to identify process excursions. The images may be processed in accordance with known excursion identification techniques. For example, the reflectance measured at multiple wavelengths can be compared to modeled reflectance or known good samples. Measured patterns may also be compared at different locations across the sample to identify variation and/or outliers. Measured variation can be quantified by calculating root-mean-squared (RMS) difference at multiple wavelengths. Measurement sensitivity can be enhanced by selecting the wavelength or wavelengths that have the highest sensitivity based on measurement data. Multiple wavelength reflectance can be processed by non-linear regression to a theoretical model to derive film thickness and/or CD of a pattern.

It should be appreciated that the imaging reflectometers described herein may be configured as standalone metrology tools or integrated with other metrology or process tools. As an example, an imaging reflectometer as described herein may be integrated with a process tool and arranged outside a window separating the imaging reflectometer from a process chamber. In some embodiments, a large field lens arranged outside the window provides illumination for a sample arranged inside the process chamber. The large field lens may be configured to provide illumination to all or a portion of the sample (e.g., a measurement area may be about the same size as a die or stepper field). This allows reflectometry measurements to be performed during and/or immediately after processing while samples are inside a vacuum chamber. This can shorten the control loop, improve process control, and avoid material damage caused by air environment.

Figure 5A:
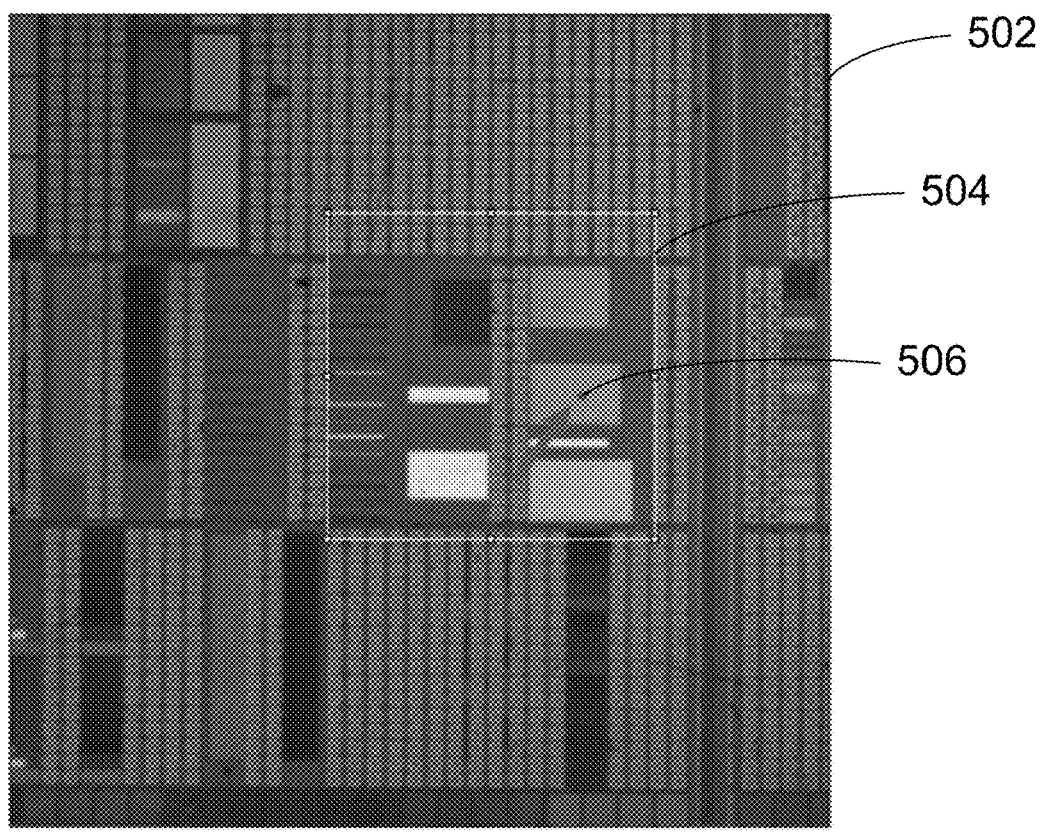
FIG. 5A is an image showing a measurement area on a sample that includes different types of structures.
Figure 5B:
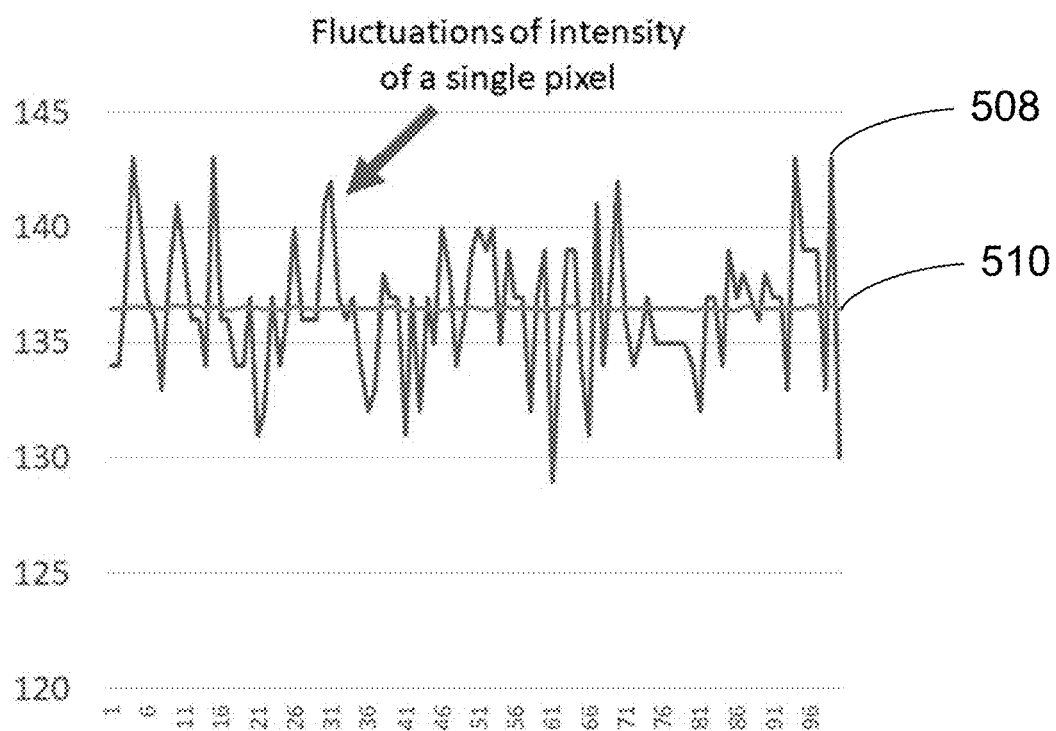
FIG. 5B is a plot illustrating measurement noise from a single pixel and measurement noise from multiple pixels in accordance with an embodiment.

FIGS. 5A-5B illustrate how signal to noise ratio can be increased by combining measurements from different pixels in an image in accordance with an embodiment. In FIG. 5A, a measurement area 504 within an image 502 is outlined by a square. For purposes of this example, it is assumed that the measurement area 504 corresponds to a 200 pixel by 200 pixel area of the image 502 (or of an imaging sensor). A spot 506 within the measurement area 504 is indicated by an arrow, and the spot 506 corresponds to a single pixel.

In an experiment, approximately 100 images were captured, and within each image a reflectance intensity value from the spot 506 was compared with an average reflectance intensity value from the 40,000 pixels within the 200 pixel by 200 pixel measurement area 504. The results are shown in FIG. 5B, where the measured reflectance intensity value 508 from the single spot 506 has considerably more noise than the average reflectance intensity value 510 from the 40,000 pixels within the measurement area 504.

Figure 6:
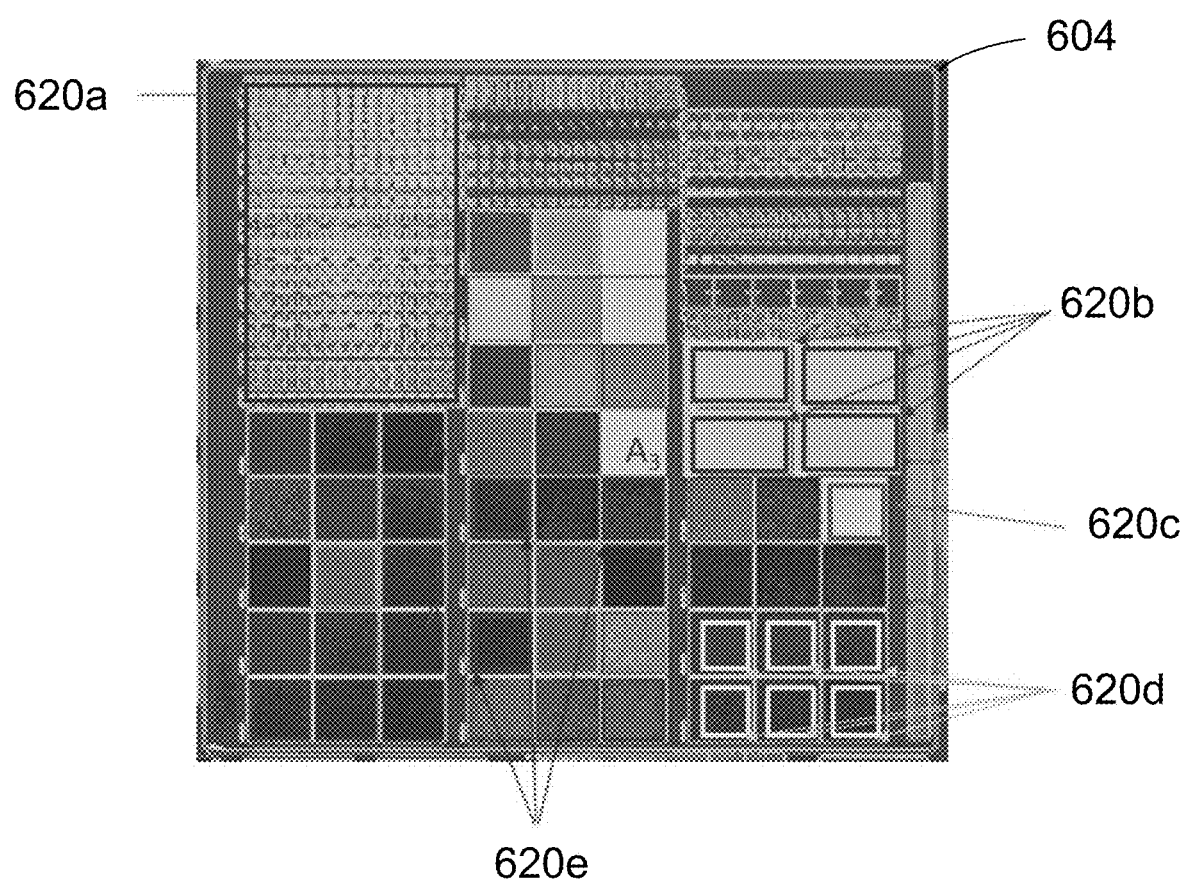
FIG. 6 shows multiple images that each include a measurement area in accordance with an embodiment.

FIG. 6 is an image highlighting similar structures within a measurement area 604 in accordance with an embodiment. In this image, some of the structures on a surface of the sample have similar features. As examples, the structures within sub-areas 620a, 620b, 620c, 620d, 620e each have similar structures. Sub-area 620a is a single contiguous area that includes many small structures, some of which appear to have slightly different patterns, but the small structures are all grouped together within the same part of the measurement area 604. Sub-areas 620b include four adjacent but separate sub-areas that extend over larger structures that do not appear to be patterned, while sub-area 620e include 3 areas that are not adjacent and do not appear to be patterned. Sub-areas 620b and 620c also have similar structures.

Signal to noise ratio of reflectance intensity values can be increased by combining measurements from the pixels within each sub area. For example, a representative reflectance intensity value can be determined from the reflectance intensity values of the pixels within sub-area 620a. A parameter associated with the similar structures in sub-area 620a can be determined using the representative reflectance intensity value. The representative reflectance intensity value may be an average, sum, or the like, and the parameter may be a CD or film thickness. The same process can be performed using the reflectance intensity values of the pixels within each of the other sub-areas. Parameters associated with each of the other sub-areas 620b, 620c, 620d, 620e may be determined in a similar manner.

Figure 7:
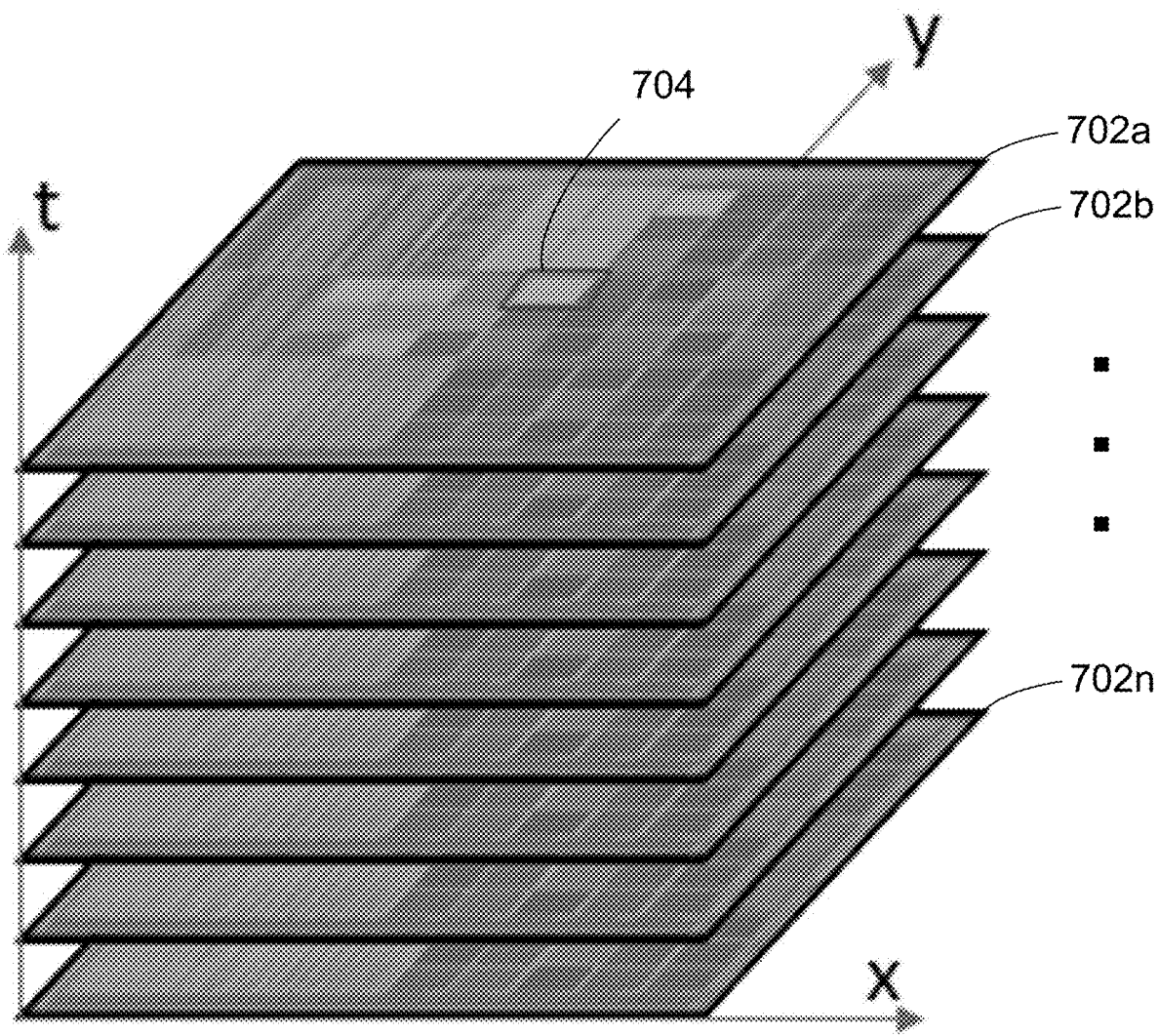
FIG. 7 is an image highlighting similar structures within a measurement area in accordance with an embodiment.

FIG. 7 shows multiple images 702a, 702b, . . . 702n that each include a measurement area 704 in accordance with an embodiment. In this example, the x- and y-axes represent two dimensional locations within the images 702a, 702b, . . . 702n, and the z-axis represents time. Although not shown in this example because of the way the images 702a, 702b, . . . 702n are stacked, the measurement area 704 is located in the same area in each image (or the measurement area 704 includes the same x, y pixels in each image). Also, the measurement area 704 in each image includes the same features on the sample.

As explained with regard to FIG. 5B, signal to noise ratio can be increased by determining an average reflectance intensity value from each of the pixels within the measurement area. In a similar manner, the signal to noise ratio can be increased by using the multiple images 702a, 702b, . . . 702n to determine a first average reflectance intensity value for each x, y pixel location. That is, a pixel in each image at the same x, y location can be used to determine a first average reflectance intensity value for each x, y pixel location in the measurement area 704. Then, using the first average reflectance intensity value for each pixel, a second average reflectance intensity value can be determined for a given structure within the measurement area 704 using just those pixels that are associated with the structure. A parameter associated with the structure, such as CD or film thickness, may be determined using the second average reflectance intensity value.

It should be appreciated that while average reflectance intensity values have been used in the previous example, other parameters or statistical methods may be used in determining representative reflectance intensity values. For example, median reflectance intensity values, a sum of the reflectance intensity values, or other parameters or statistical methods may be used with the embodiments described herein.

Also, while a pixel in each image at the same x, y location can be used to determine a first average reflectance intensity value for each x, y pixel location, pixels in each image at approximately the same x, y location may be used in some embodiments. Pixels at approximately the same x, y location include pixels that are associated with approximately the same part of the measurement area in each image (i.e., pixels that are not at the same x, y location but include image information from the same part of the sample).

Figure 8:
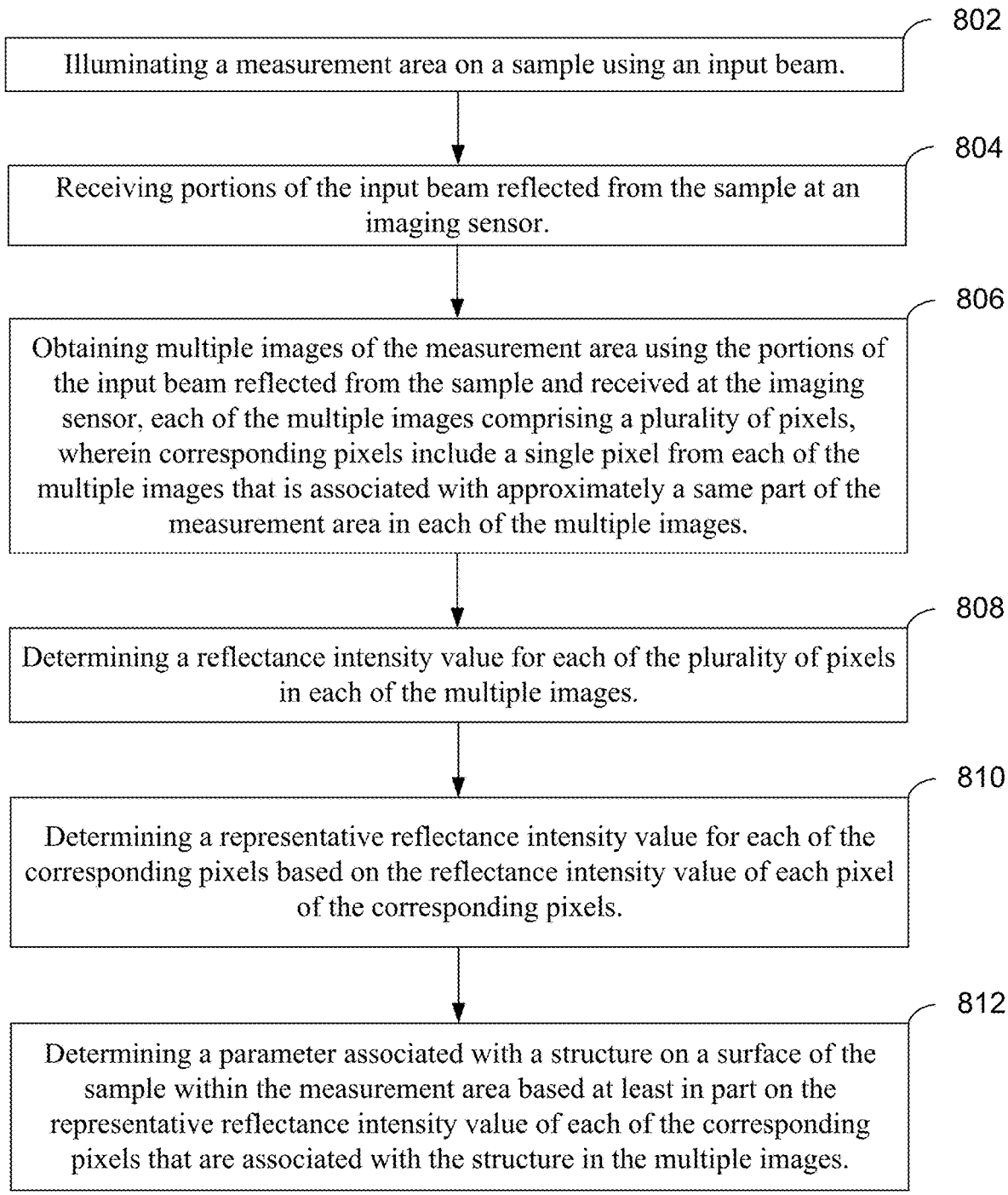
FIG. 8-9 are flowcharts illustrating methods for performing imaging reflectometry measurements in accordance with some embodiments.

FIG. 8 is a flowchart illustrating a method for performing imaging reflectometry measurements in accordance with an embodiment. The method includes illuminating a measurement area on a sample using an input beam (802), and receiving portions of the input beam reflected from the sample at an imaging sensor (804). The measurement area may be an area that is smaller than the sample. The input beam may be a broadband beam or a beam having a narrow wavelength range (e.g., a range of about 0.1 nm or less to about 50 nm or more). The imaging sensor may include one or more digital cameras.

The method also includes obtaining multiple images of the measurement area using the portions of the input beam reflected from the sample and received at the imaging sensor, each of the multiple images comprising a plurality of pixels, wherein corresponding pixels include a single pixel from each of the multiple images that is associated with approximately a same part of the measurement area in each of the multiple images (806). The corresponding pixels may each have the same x, y pixel location, or the corresponding pixels may include image information from the same part of the sample.

A reflectance intensity value for each of the plurality of pixels in each of the multiple images is determined (808), and a representative reflectance intensity value is determined for each of the corresponding pixels based on the reflectance intensity value of each pixel of the corresponding pixels (810). The representative reflectance intensity value for each of the corresponding pixels may be, for example, an average or sum based on the reflectance intensity value of each pixel of the corresponding pixels.

The method also includes determining a parameter associated with a structure on a surface of the sample within the measurement area based at least in part on the representative reflectance intensity value of each of the corresponding pixels that are associated with the structure in the multiple images (812). The parameter associated with the structure may include a CD and/or film thickness.

Figure 9:
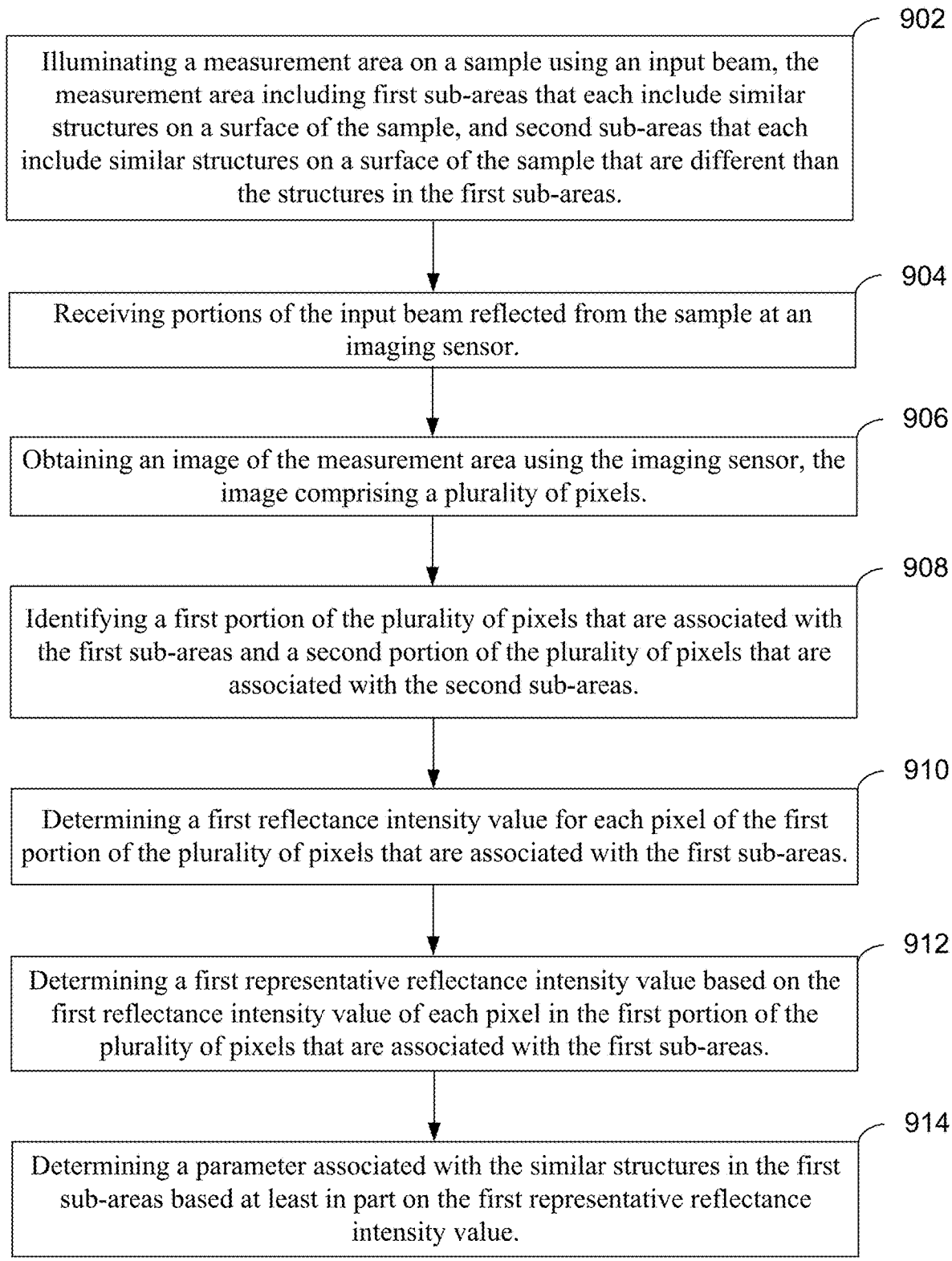

FIG. 9 is a flowchart illustrating a method for performing imaging reflectometry measurements in accordance with another embodiment. The method includes illuminating a measurement area on a sample using an input beam, the measurement area including first sub-areas that each include similar structures on a surface of the sample, and second sub-areas that each include similar structures on a surface of the sample that are different than the structures in the first sub-areas (902). The first and second sub-areas are areas that are smaller (or have fewer pixels) than the measurement area. The first and second sub-areas may each include a single area, a single area with structures having similar patterns, multiple areas that each have structures having similar patterns, or multiple areas that each have similar structures. The multiple areas may be adjacent or separated from each other with the measurement area.

The method also includes receiving portions of the input beam reflected from the sample at an imaging sensor (904), and obtaining an image of the measurement area using the imaging sensor, the image comprising a plurality of pixels (906).

The method also includes identifying a first portion of the plurality of pixels that are associated with the first sub-areas and a second portion of the plurality of pixels that are associated with the second sub-areas (908). The pixels that are associated with the first and second sub-areas may be identified based on reflectance intensity values. For example, similar reflectance intensity values may be grouped within a sub-area. Alternatively, the pixels that are associated with the first and second sub-areas may be identified based on x, y locations within the image.

A first reflectance intensity value is determined for each pixel of the first portion of the plurality of pixels that are associated with the first sub-areas (910), a first representative reflectance intensity value is determined based on the first reflectance intensity value of each pixel in the first portion of the plurality of pixels that are associated with the first sub-areas (912), and a parameter associated with the similar structures in the first sub-areas is determined based at least in part on the first representative reflectance intensity value (914).

It should be appreciated that the specific steps illustrated in FIGS. 8-9 provide particular methods for measuring reflectivity according to some embodiments. Other sequences of steps may also be performed according to alternative embodiments. For example, alternative embodiments may perform the steps outlined above in a different order. Moreover, the individual steps illustrated in FIGS. 8-9 may include multiple sub-steps that may be performed in various sequences. Furthermore, additional steps may be added or removed depending on the particular application.

While the foregoing is directed to specific embodiments, other and further embodiments may be devised without departing from the basic scope thereof. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for performing imaging reflectometry measurements, the method comprising:
    illuminating a measurement area on a sample using an input beam;
    receiving portions of the input beam reflected from the sample at an imaging sensor;
    obtaining multiple images of the measurement area using the portions of the input beam reflected from the sample and received at the imaging sensor, each of the multiple images comprising a plurality of pixels, wherein corresponding pixels include a single pixel from each of the multiple images that is associated with approximately a same part of the measurement area in each of the multiple images;
    determining a reflectance intensity value for each of the plurality of pixels in each of the multiple images;
    determining a representative reflectance intensity value for each of the corresponding pixels based on the reflectance intensity value of each pixel of the corresponding pixels; and
    determining a parameter associated with a structure on a surface of the sample within the measurement area based at least in part on the representative reflectance intensity value of each of the corresponding pixels that are associated with the structure in the multiple images.

2. The method of claim 1 wherein the representative reflectance intensity value for each of the corresponding pixels is an average based on the reflectance intensity value of each pixel of the corresponding pixels.

3. The method of claim 1 further comprising determining a composite image of the measurement area, wherein each pixel of the composite image is determined based on the representative reflectance intensity value for each of the corresponding pixels.

4. The method of claim 1 wherein the parameter associated with the structure is film thickness.

5. The method of claim 1 wherein the parameter associated with the structure is critical dimension (CD).

6. The method of claim 1 wherein each of the multiple images are obtained using approximately a same integration length of time.

7. The method of claim 1 wherein each of the multiple images are obtained using a different integration length of time.

8. The method of claim 1 wherein the portions of the input beam are reflected from the surface of the sample.

9. The method of claim 1 wherein the structure comprises a plurality of structures.

10. A method for performing imaging reflectometry measurements, the method comprising:
    illuminating a measurement area on a sample using an input beam, the measurement area including first sub-areas that each include similar structures on a surface of the sample, and second sub-areas that each include similar structures on a surface of the sample that are different than the similar structures in the first sub-areas;
    receiving portions of the input beam reflected from the sample at an imaging sensor;
    obtaining an image of the measurement area using the imaging sensor, the image comprising a plurality of pixels;
    identifying a first portion of the plurality of pixels that are associated with the first sub-areas and a second portion of the plurality of pixels that are associated with the second sub-areas;
    determining a first reflectance intensity value for each pixel of the first portion of the plurality of pixels that are associated with the first sub-areas;
    determining a first representative reflectance intensity value based on the first reflectance intensity value of each pixel in the first portion of the plurality of pixels that are associated with the first sub-areas; and
    determining a parameter associated with the similar structures in the first sub-areas based at least in part on the first representative reflectance intensity value.

11. The method of claim 10 wherein the first representative reflectance intensity value is an average based on the first reflectance intensity value of each pixel in the first portion of the plurality of pixels.

12. The method of claim 10 wherein at least some of the first sub-areas are not immediately adjacent to others of the first sub-areas within the measurement area.

13. The method of claim 10 wherein the parameter associated with the similar structures in the first sub-areas is film thickness.

14. The method of claim 10 wherein the parameter associated with the similar structures in the first sub-areas is critical dimension (CD).

15. The method of claim 10 wherein the similar structures in the first sub-areas have a similar surface pattern, and the similar structures in the second sub-areas have a different surface pattern.

16. The method of claim 10 further comprising:
- determining a second reflectance intensity value for each pixel of the second portion of the plurality of pixels that are associated with the second sub-areas;
- determining a second representative reflectance intensity value based on the second reflectance intensity value of each pixel in the second portion of the plurality of pixels that are associated with the second sub-areas; and
- determining a parameter associated with the similar structures in the second sub-areas based on the second representative reflectance intensity value.

17. The method of claim 10 wherein the similar structures in the first sub-areas each comprise a plurality of structures.

* * * * *